United States Patent
Kristiansen

(10) Patent No.: US 6,724,995 B1
(45) Date of Patent: Apr. 20, 2004

(54) BIDIRECTIONAL ROUTER AND A METHOD OF BIDIRECTIONAL AMPLIFICATION

(75) Inventor: René E. Kristiansen, Brønshøj (DK)

(73) Assignee: Tellabs Denmark A/S, Ballerup (DK)

( * ) Notice: Subject to any disclaimer, the term of this patent is extended or adjusted under 35 U.S.C. 154(b) by 0 days.

(21) Appl. No.: 09/331,718
(22) PCT Filed: Dec. 22, 1997
(86) PCT No.: PCT/DK97/00591
§ 371 (c)(1), (2), (4) Date: Sep. 24, 1999
(87) PCT Pub. No.: WO98/28874
PCT Pub. Date: Jul. 2, 1998

(30) Foreign Application Priority Data

Dec. 23, 1996 (DK) .................. 1504/96

(51) Int. Cl.⁷ .................. H04J 14/02
(52) U.S. Cl. .................. 398/82; 398/102; 398/107; 398/135; 398/140; 385/15; 385/27; 385/31; 385/41
(58) Field of Search .................. 359/127, 124, 359/128, 140, 143, 151, 152, 154, 166, 174, 179, 333; 385/15, 27, 28, 31, 39, 41, 42; 398/82, 79, 83

(56) References Cited

U.S. PATENT DOCUMENTS

| 5,050,952 A | 9/1991 | Fussgäger ............... 359/114 |
| 5,056,885 A | * 10/1991 | Chinn .................. 385/13 |
| 5,444,725 A | 8/1995 | Zirngibl ................ 372/20 |
| 5,452,124 A | 9/1995 | Baker .................. 359/341 |
| 5,493,625 A | 2/1996 | Glance ................. 385/24 |
| 5,636,309 A | * 6/1997 | Henry et al. ........... 385/129 |
| 5,832,154 A | * 11/1998 | Uetsuka et al. ......... 385/37 |
| 5,889,899 A | * 3/1999 | Henry et al. ........... 359/130 |
| 6,081,368 A | * 6/2000 | Delavaux ............... 359/114 |
| 6,088,494 A | * 7/2000 | Keck et al. ............ 385/27 |
| 6,130,899 A | * 10/2000 | Epworth et al. ......... 359/341.33 |

FOREIGN PATENT DOCUMENTS

| EP | 0212769 | 3/1987 | ........... G02B/6/10 |
| EP | 0528652 | 2/1993 | ........... G02B/6/34 |
| EP | 0530878 | 3/1993 | ........... H04B/10/12 |
| EP | 0565308 | 10/1993 | ........... G02B/6/12 |
| EP | 0612164 | 8/1994 | ........... H04J/14/02 |
| EP | 0612165 | 8/1994 | ........... H04J/14/02 |
| EP | 0618747 | 10/1994 | ........... H04Q/11/00 |
| EP | 0704726 | 4/1996 | ........... G02B/6/34 |
| EP | 0720408 | 7/1996 | ........... H04Q/11/00 |
| EP | 0729248 | 8/1996 | ........... H04J/14/02 |
| WO | 9522070 | 8/1995 | ........... G02B/6/34 |

* cited by examiner

Primary Examiner—Nina Tong
(74) Attorney, Agent, or Firm—Baker Botts L.L.P.

(57) ABSTRACT

The invention relates to a router which may be used for amplification of a bidirectional optical signal using a single optical amplifier.

An advantageous embodiment of the invention comprises two 3 dB couplers which are serially connected via a delay element. According to the embodiment, the delay element comprises a difference in distance ΔL between the two optical branches which connect the two 3 dB couplers.

20 Claims, 2 Drawing Sheets

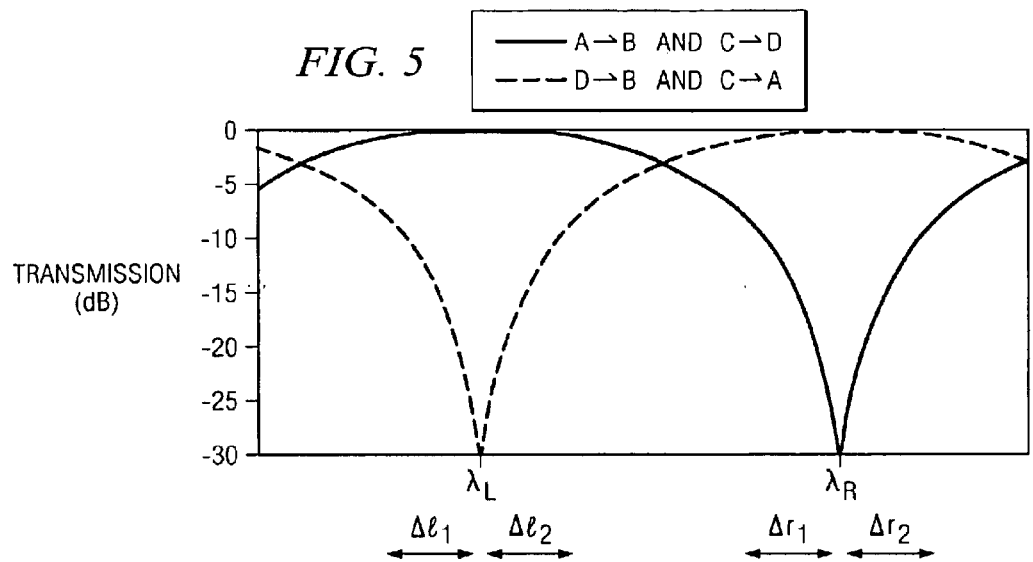
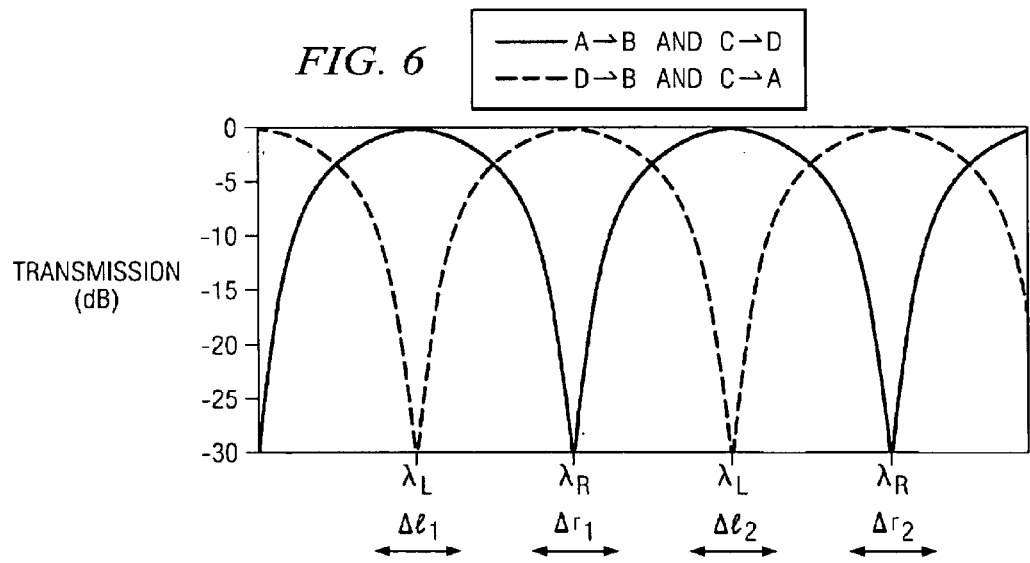

BIDIRECTIONAL ROUTER AND A METHOD OF BIDIRECTIONAL AMPLIFICATION

RELATED APPLICATIONS

The present Application claims the benefit of PCT Application PCT/DK97/00591 filed Dec. 22, 1997 which claims the benefit of Denmark Application 1504/96.

TECHNICAL FIELD OF THE INVENTION

The invention relates to a router and to a method of monodirectional amplification of bidirectional optical signals.

BACKGROUND OF THE INVENTION

In optical transmission systems it is frequently desired to use an optical fibre for bidirectional communication. This is achieved in most practical systems by using wavelength multiplexing so that transmission in one direction takes place at one or more wavelengths, and so that transmission in the other direction takes place at one or more other wavelengths different from the first-mentioned wavelengths.

Since the signals are transmitted through an optical fibre, they will be subjected to attenuation, which necessitates amplification of the optical signals if they are to be transmitted over great distances.

According to the prior art this bidirectional amplification may be achieved by suitable coupling of wavelength multiplex couplers and a unidirectional amplifier. This method, however, is complicated and consequently involves relatively huge costs.

SUMMARY OF THE INVENTION

U.S. Pat. No. 5,452,124 discloses a similar system in which a four-part wave ength-division multiplexing filter comprises a multilayer dichroic substrate and self-focusing lenses. The optical signals are connected to two bidirectional ports while the amplifier is connected to two unidirectional ports. Also this solution is complicated and costly.

The router comprises two optical couplers interconnected serially via a delay device and wherein the optical router further comprises an optical amplifier optically connected to one of the optical couplers, a simple and economical router is obtained, which may be designed according to simple dimensioning principles and be adapted to concrete applications. The property that for each optical input an optical coupler ideally divides an arriving optical signal between the outputs of the coupler means that an output signal from the first coupler contains mixed signals, which may subsequently be "mixed back" in the following optical coupler. In a suitable embodiment of the delay device, this back-mixing may have the effect that signals with different wavelength components may be fed jointly and selectively to a selected output port on the following coupler, ideally, with conservation of energy, as the interferometer properties of the delay device are utilized.

This complete signal may additionally be fed back into a port on the following coupler, whereby the input ports of the first coupler also serve as output ports.

This property is particularly advantageous in applications where a bidirectional optical signal is to be amplified with a monodirectional amplifier, as a monodirectional amplifier may be coupled between the terminals of the last coupler and amplify both optical signals, following which these, in an amplified state, may be fed back to the bidirectional port of the router. It is noted in particular that the amplified signal is routed to another bidirecional port, for which reason the complete router may be coupled between two fibre ends of a directional light guide cable having a fibre end for bidirectional router ports, amplify arriving optical signals with given wavelengths, and transmit these out on the other bidirectional port to the other fibre end and further on the light guide in the same direction as when it arrived at the router.

When the delay device comprises a difference in distance ΔL between the two optical guides connecting the two couplers, a simple embodiment of the invention is obtained, as the difference in distance ΔL provides a mutual phase shift between the two optical signals on the input of the following coupler, which means that the coupler serves as an interferometer in the mixing in the coupler itself.

It will be appreciated that ΔL is not to be taken to mean a separate physical element, but is an indication of the real MZI difference in distance between the two serially connected couplers.

When 3 dB couplers are used, a particularly simple embodiment of the invention is obtained. The use of 3 dB couplers will usually be preferred, as the characteristic of the complete router is particularly simple when the optical branches of the constituent couplers are symmetrical.

When the delay device is formed by one or more pairs of electrodes arranged along the optical path, a further embodiment of the invention is obtained, wherein a desired phase shift between the optical signals may be achieved by changing the refractive index in the optical path in the delay element in response to an electrical field applied by the electrodes.

When the delay element is provided with one or more pairs of electrodes arranged along the optical path in the delay element to achieve a supplementary time delay, an advantageous embodiment of the invention is obtained, as a desired phase shift between the optical signals may be obtained at an optical,difference in distance ΔL, and be finely adjusted by changing the refractive index in the optical path in the delay element in response to an electrical field applied by the electrodes.

When ΔL is equal to $\lambda^2/(2\Delta\lambda n)$ where $\lambda$ indicates the optical wavelength used, n is the refractive index, and $\Delta\lambda$ indicates the half-period of the power transfer function, i.e. ½ FSR (FSR=free spectral range), a practical embodiment of the invention is obtained.

For clarity, it should be mentioned that a selected wavelength of 1550 nm, a refractive index n=1.5, and Δλ=10 nm, result in a difference in distance of ΔL 80 μm.

When the router is made in an integrated design, an optimum design for commercial use is obtained. This should be taken to mean that the actual design of the delay element is to be made with a relatively great precision, as the necessary distances ΔL are relatively small, and even small deviations therefrom give rise to a relatively great unreliability with respect to the overall system.

When the optical signals in each direction toward the router are fed to the first bidirectional port A and the second bidirectional port D, respectively, of the router and from there to the first unidirectional port B of the router, further through an optical amplifier connected to the unidirectional ports and from there through the second unidirectional port C of the router and back through the router to the second bidirectional D and the first bidirectional port A, respectively, an effective bidirectional amplification is obtained, using relatively inexpensive elements. The bidirectional amplification obtained is moreover obtained using just one monodirectional amplifier.

When $\lambda_{r1}$ and $\lambda_{r2}$ are allocated on the power transfer function of the router in one transmission direction on each side of a maximum of $\lambda_R$, and $\lambda_{11}$ and $\lambda_{12}$ are allocated on the power transfer function of the router in the other transmission direction on each side of a maximum of $\lambda_L$, said bidirectional optical signals having the wavelengths $\lambda_{11}$ and $\lambda_{12}$ in one direction and having the wavelengths $\lambda_{r1}$ and $\lambda_{r2}$ in the other direction, said $\lambda_L$ and $\lambda_R$ indicating a maximum in a specific frequency band for the power transfer function of the router in one direction and the power transfer function of the router in the other direction, respectively, an effective amplification of a bidirectional signal is obtained, using a relatively simple and inexpensive technique, as a two-channel signal may thus be transmitted and amplified each way through the router.

BRIEF DESCRIPTION OF THE DRAWINGS

The invention will be described below with reference to the drawing, in which:

FIG. 5 shows a first channel coupling characteristic for an MZI router of the invention, and FIG. 6 shows an additional channel coupling characteristic for an MZI router of the invention.

DETAILED DESCRIPTION OF THE INVENTION

Figure 1:
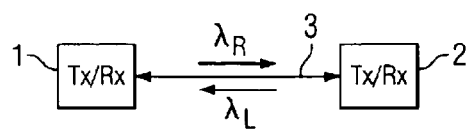
FIG. 1 shows a communications system consisting of two network elements.

FIG. 1 shows a communications system consisting of two network elements 1 and 2 connected by a wavelength multi-plexed bidirectional optical connection 3. The network element 2 transmits at the wavelength $\lambda_L$, and the network element 1 transmits at the wavelength $\lambda_R$. Since the connection is wavelength-divided, it is possible to transmit communications signals from 1 to 2 while transmitting from 2 to 1. In practical systems, the connection 3 is an optical fibre which subjects the transmitted signals from both 1 and 2 to attenuation through the fibre. If the system is to be used over great distances, it is necessary to insert one or more amplifiers in the connection 3.

If there is one or more locations on the connection 3 where the signals, which are transmitted from both 1 and 2, have travelled such a great distance through the optical fibre as makes it necessary to amplify them, then a router is inserted so that a single traditional unidirectional amplifier may be used for amplifying signals transmitted from both 1 and 2.

Figure 2:
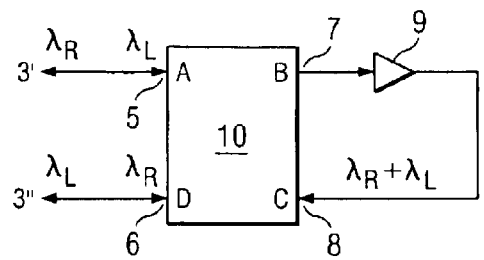
FIG. 2 shows an MZI router according to the invention.

FIG. 2 shows a known router 10.

The router 10 has two bidirectional ports 5 and 6 and two unidirectional ports 7 and 8. An amplifier 9 is inserted between the two unidirectional ports 7 and 8. The input of the amplifier is connected to the unidirectional port 7, and the output of the amplifier is connected to the unidirectional port 8.

On the ports 5 and 6, the router 10 is connected to two optical fibres 3' and 3" which are connected to the ports 5 and 6, respectively.

The router 10 is arranged such that a signal transmitted at the wavelength $\lambda_L$ into the router through the port 5 has maximum power on the port 7 and minimum power on the port 8. Correspondingly, a signal transmitted at the wavelength $\lambda_R$ into the router through the port 6 has maximum power on the port 7 and minimum power on the port 8. The amplifier may therefore amplify the signals at both $\lambda_R$ and $\lambda_L$. The amplified signals are transmitted via the same router 10 through the port 8. The amplified signal at $\lambda_R$ is transmitted out through the port 5, and, correspondingly, the amplified signal at $\lambda_L$ is transmitted out through the port 6. Such a router 10 thus ensures that a traditional unidirectional amplifier may be used for amplifying bidirectional signals.

In the figure, a unidirectional amplifier 9 is connected to the unidirectional output port 9 of the router 10 and the unidirectional input port 8 of the router 10.

Figure 3:
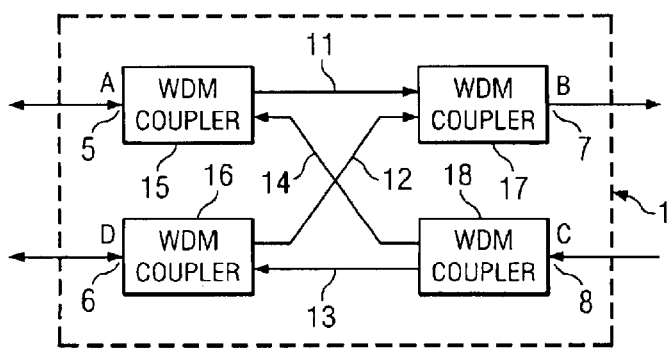
FIG. 3 shows a known coupler.

FIG. 3 shows how a known router 10 is constructed.

The router comprises four wavelength multiplex couplers 15, 16, 17 and 18. The wavelength multiplex couplers are also called WDM couplers.

The wavelength multiplex coupler 15 is connected to the wavelength multiplex coupler 17 via an optical connection 11. The wavelength multiplex coupler 16 is connected to the same wavelength multiplex coupler 17 via an optical connection 12. The wavelength multiplex coupler 17 is subsequently optically connected to the port 7.

The wavelength multiplex coupler 15 filters such that the optical signal $\lambda_L$, received on the port 5 via the connection 11, is fed to the wavelength multiplex coupler 17, while the wavelength multiplex coupler 16 filters such that the optical signal $\lambda_R$, received on the port 6 via the connection 12, is fed to the wavelength multiplex coupler 17. The complete signal consisting of $\lambda_R$ and $\lambda_L$ is thus fed to the port 7, which may subsequently be connected to an optical amplifier capable of amplifying the complete received signal from the fibre 3' and 3", respectively.

Subsequently, an input port 8 feeds the complete amplified signal to the wavelength multiplex coupler 18, which separates the received amplified optical signal again into two amplified signals consisting of $\lambda_R$, and $\lambda_L$, respectively, which are fed via the connections 14 and 13 to the wavelength multiplex coupler 15 and the wavelength multiplex coupler 16, respectively, which subsequently feed the amplified signals at $\lambda_R$ and $\lambda_L$, respectively, out to the ports 5 and 6 connected to them.

Figure 4:
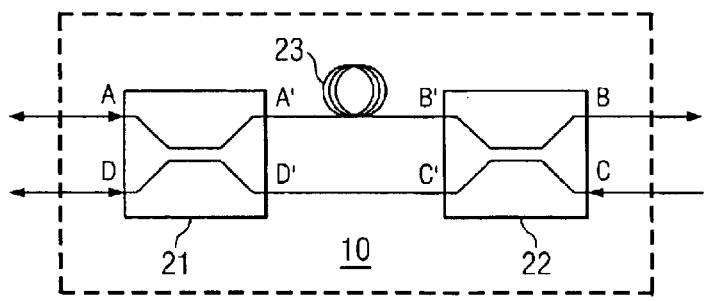
FIG. 4 shows a preferred embodiment of the invention.

FIG. 4 shows a preferred embodiment of the invention. The shown router 10 of the invention comprises two 3 dB couplers 21 and 22.

The coupler 21 comprises ports A, A', D and D', and the coupler 22 comprises ports B', B, C' and C.

The ports A' and B' are interconnected optically by a delay device 23, and also the ports D' and C' are interconnected optically.

The central aspect of the invention is the transmission matrix T of the optical 3 dB coupler. With reference to FIG. 4 an optical field $\vec{E}_1(\lambda_1)$ at the wavelength $\lambda_1$ applied to the port A and a second field $\vec{E}_2(\lambda_2)$ at the wavelength $\lambda_2$ applied to the port D of an ideal 3 dB coupler will give rise to an optical field on the port A', D'

$$\begin{bmatrix} \vec{E}_{A''} \\ \vec{E}_{D'} \end{bmatrix} = \frac{1}{\sqrt{2}} \begin{bmatrix} 1 & e^{j\frac{\pi}{2}} \\ e^{j\frac{\pi}{2}} & 1 \end{bmatrix} \begin{bmatrix} \vec{E}_1(\lambda_1) \\ \vec{E}_2(\lambda_2) \end{bmatrix}$$

where the transmission matrix $T_1$ of the 3 dB coupler is defined:

$$T_1 = \begin{bmatrix} 1 & e^{j\frac{\pi}{2}} \\ e^{j\frac{\pi}{2}} & 1 \end{bmatrix}$$

Without loss of generality, losses in the transmission A' to B' and D' to C' and the absolute time delay in the transmission may be disregarded. The only important parameter in the transmission is therefore the difference in distance $\Delta_L$ between the two optical connections A' to B' and D' to C'. The transmission matrix $T_2$ for the four-port A', B', C', D' may be written:

$$T_1 = \begin{bmatrix} e^{-j\frac{2\pi}{\lambda}n\Delta L} & 0 \\ 0 & 1 \end{bmatrix}$$

Since B', C' in FIG. 4 are connected to another ideal 3 dB coupler, the transmission matrix $T_3$ for the port B', C', B, C is known, since $T_3=T_1$. The overall transmission matrix $T_s$ for the port A, D, B, C may be written $$T_s = T_3 T_2 T_1$$

and the fields on the ports B and C may thereby be calculated $$\begin{bmatrix} \vec{E}_B \\ \vec{E}_C \end{bmatrix} = \left(\frac{1}{\sqrt{2}}\right)^2 \begin{bmatrix} 1 & e^{j\frac{\pi}{2}} \\ e^{j\frac{\pi}{2}} & 1 \end{bmatrix} \begin{bmatrix} e^{-j\frac{2\pi}{\lambda}n\Delta L} & 0 \\ 0 & 1 \end{bmatrix} \begin{bmatrix} 1 & e^{j\frac{\pi}{2}} \\ e^{j\frac{\pi}{2}} & 1 \end{bmatrix} \begin{bmatrix} \vec{E}_1(\lambda_1) \\ \vec{E}_2(\lambda_2) \end{bmatrix}$$

Owing to the symmetry of the optical circuit, the transmission matrix $T_s$ may also be used for calculating the fields which will occur on the ports A and D as a function of the fields applied to the ports B and C, i.e. the opposite way back through the router. It is noted that, ideally, no field is applied to B but just to the port C according to the invention.

As another object of the invention is the extinction of the field on the port C caused by the fields on the port A and D, the conditions of this extinction are made in the light of the transmission matrix $T_s$ $$\vec{E}_C = \vec{E}_1(\lambda_1)\left(e^{-j\frac{2\pi}{\lambda_1}n\Delta L} + e^{j\pi}\right) + \vec{E}_2(\lambda_2)\left(e^{-j\frac{2\pi}{\lambda_2}n\Delta L} + e^{j\pi}\right)$$

For this field to be extinguished, the coefficients of $\vec{E}_1(\lambda_1)$ and $\vec{E}_2(\lambda_2)$ must be zero. This is satisfied if $\Delta L$ is selected so that $$\frac{2\pi}{\lambda_1}n\Delta L = p2\pi \text{ and } \frac{2\pi}{\lambda_2}n\Delta L = p2\pi + \pi$$

where $p \in N$, the set of natural numbers.

Similar calculations give the resulting field on the port B:

$$\vec{E}_B = -\vec{E}_1(\lambda_1) + \vec{E}_2(\lambda_2)$$

This means that the fields $\vec{E}_1(\lambda_1), \vec{E}_2(\lambda_2)$ are transmitted out of the port B with full amplitude, and that the fields will be extinct on the port C, thereby allowing a unidirectional amplifier to be used between the terminals B and C.

If the field $E_B$ is amplified and coupled on the port C, the transmission matrix $T_S$ may be used for calculating the field which occurs on the port A and D as a consequence of the amplified field on the port C. The fields on the ports A and D caused by the field applied to the port C are calculated relatively to the field on the port C:

The field into the port C is defined:

$$\vec{E}_C = \vec{E}_1(\lambda_1) + \vec{E}_2(\lambda_2)$$

and results in a field on the port A:

$$\vec{E}_A = \vec{E}_2(\lambda_2)e^{j\pi/2}$$

Similarly, the field out of the port D is calculated:

$$\vec{E}_D = \vec{E}_1(\lambda_1)$$

This means that the field received e.g. on the port A at the wavelength $\lambda_L$ may be amplified and transmitted out of the port D, and a field received on the port D at the wavelength $\lambda_R$ may be amplified with the same amplifier and transmitted out of the port A.

A power consideration illustrates how an MZI router may directionally couple several channels at various wavelengths in each direction. This is possible, provided that complete extinction of the fields on the port C is not necessary. This may be achieved particularly when optical insulators are used in connection with the two terminals of the optical amplifier.

If it is defined that $\vec{E}_2(\lambda_2) = \vec{0}$ the port D and $\vec{E}_1(\lambda_1)$ on the port A have the power $P_1$, the resulting power $P_B$ and $P_C$ on the port B and the port C, respectively, may be calculated $$P_B = \frac{1}{2}P_1\left(1 + \cos\left(\frac{2\pi f}{c}n\Delta L + \pi\right)\right) \text{ and}$$

$$P_C = \frac{1}{2}P_1\left(1 + \cos\left(\frac{2\pi f}{c}n\Delta L\right)\right)$$

where frequency is substituted for wavelength. It will be seen that the two power transfer functions are offset $\pi$ with respect to each other and are period with the period $\Delta f = FSR$, the free spectral range $$FSR = \frac{c}{n\Delta L}$$

FIG. 5 shows a first channel coupling characteristic for an MZI router. The figure shows a first example of how two frequency multiplexed channels in each direction may be allocated in relation to the power transfer function. The power transfer function of the MZI router has two minima/maxima in a specific frequency band at $\lambda_R$ and $\lambda_L$, respectively. The four channels are positioned two by two in terms of frequency so that the two wavelengths $\lambda_{r1}$ and $\lambda_{r2}$ associated with $\lambda_R$ are positioned on each side of minima/maxima $\lambda_R$ and so that the two wavelengths $\lambda_{11}$ and $\lambda_{12}$ associated with $\lambda_L$ are positioned on each side of minima/maxima $\lambda_L$. It is noted that the shown allocation windows $\Delta r1$, $\Delta r2$ and $\Delta l1$, $\Delta l2$ indicate the wavelengths which may be selected for each of the above-mentioned four channels $\lambda_{r2}, \lambda_{r2}, \lambda_{11}$ and $\lambda_{12}$.

In the shown embodiment, one boundary of the allocation window is selected in consideration of the fact that the difference between the transmission of the power transfer function from A to D and vice versa must be at least 10 dB. It is noted that this boundary may vary from application to application.

The other boundary of each allocation window is selected in consideration of the fact that there should be a certain minimal spacing between the channels on each side of $\lambda_R$ and $\lambda_L$, respectively, since there is a certain tolerance on the laser sources used for each channel.

FIG. 6 shows another channel coupling characteristic for an MZI router. The figure shows another example of how two channels in each direction may be allocated in relation to the power transfer function. The power transfer function of the MZI router has four minima/maxima in a specific frequency band in which the four channels are positioned.

The allocation windows $\Delta r1$, $\Delta r2$, $\Delta l1$ and $\Delta l2$ may be selected in this case separately in consideration of the fact that the difference between the transmission of the power transfer function from A to D and vice versa must be at least 10 dB. It should be noted that this limit may vary from application to application.

What is claimed is:

1. An optical router, characterized in that the router comprises first and second optical couplers which are serially interconnected via a delay device and wherein the optical router further comprises an optical amplifier optically connected to one of the optical couplers, wherein the first optical coupler has a first port that receives and provides optical signals at different wavelengths from and to an optical link.

2. An optical router according to claim 1, characterized in that the delay device comprises a difference in distance $\Delta L$ between the two optical guides which connect the two couplers.

3. An optical router according to claim 2, characterized in that $\Delta L = \lambda^2/(2\Delta\lambda \cdot n)$, where $\lambda$ indicates the optical wavelength used, n is the refractive index, and $\Delta\lambda$ indicates the half-period of the power transfer function in each direction, i.e. ½ FSR (FSR=free spectral range).

4. An optical router according to claim 1, characterized in that the couplers are 3 dB couplers.

5. An optical router according to claim 4, characterized in that the delay element is additionally provided with one or more pairs of electrodes arranged along the optical path in the delay element to achieve a supplementary time delay.

6. An optical router according to claim 1, characterized in that the delay device is formed by one or more pairs of electrodes arranged along the optical path.

7. An optical router according to claim 1, characterized in that the router is made in an integrated design.

8. An optical router, comprising:
 a first coupler having a first bidirectional port and a second bidirectional port, each of the first and second bidirectional ports operable to interface bidirectional optical signals with a respective optic link;
 a second coupler having an output unidirectional port and an input unidirectional port, the output unidirectional port operable to transport bidirectional optical signals of the first and second bidirectional ports, the input unidirectional port operable to provide bidirectional optical signals to the first coupler.

9. The optical router of claim 8, further comprising:
 a delay device separating the first coupler from the second coupler.

10. The optical router of claim 8, further comprising:
 an amplifier operable to amplify the bidirectional optical signals from the output unidirectional port for transmission to the input unidirectional port.

11. The optical router of claim 10, wherein the amplifier is a unidirectional amplifier.

12. The optical router of claim 8, wherein the first coupler has a third bidirectional port operable to interface bidirectional optical signals with a first unidirectional port of the second coupler through a first optical guide, wherein the first coupler has a fourth bidirectional port operable to interface bidirectional optical signals with a second unidirectional port of the second coupler through a second optical guide.

13. The optical router of claim 12, wherein the first optical guide and the second optical guide have different lengths.

14. The optical router of claim 8, wherein the bidirectional optical signals being interfaced at the first coupler over the respective optical links have at least first and second wavelengths of different magnitude.

15. The optical coupler of claim 14, wherein the bidirectional optical signals having the first wavelength at the first bidirectional port are transported through the first coupler to the second coupler and back to the first coupler for transmission at the second bidirectional port.

16. The optical coupler of claim 15, wherein the bidirectional optical signals having the second wavelength at the second bidirectional port are transported through the first coupler to the second coupler and back to the first coupler for transmission at the first bidirectional port.

17. The optical router of claim 14, wherein the bidirectional optical signals of both the first and second wavelengths are passed between the first and second couplers.

18. The optical router of claim 8, wherein the first and second couplers are 3 db couplers.

19. A method of monodirectional amplification of bidirectional optical signals with given wavelengths $\lambda_{li}$ and $\lambda_{rj}$ in an optical guide by means of an optical router, comprising:
 providing a first bidirectional port and a second bidirectional port and a first unidirectional port and a second unidirectional port;
 receiving the optical signals at the first and second bidirectional ports from an optical link;
 transferring the optical signals from the first and second bidirectional ports through a first optical coupler, a delay device, and a second optical coupler to the first unidirectional port;
 transferring the optical signals from the first unidirectional port through an optical amplifier to the second unidirectional port;
 transferring the optical signals from the second unidirectional port to the first and second bidirectional ports through the second optical coupler, the delay device, and the first optical coupler;
 transmitting the optical signals from the first and second bidirectional ports to the optical link.

20. A method according to claim 19, further comprising:
 allocating $\lambda_{r1}$ and $\lambda_{r2}$ on the power transfer function of the router in a first transmission direction on each side of a maximum of $\lambda_r$;
 allocating $\lambda_{l1}$ and $X_{l2}$ on the power transfer function of the router in a second transmission direction on each side of a maximum of $\lambda_L$,
 wherein the optical signals have wavelengths of $\lambda_{l1}$ and $\lambda_{l2}$ in the first transmission direction and wavelengths of $\lambda_{r1}$ and $\lambda_{r2}$ in the second transmission direction, and
 wherein $\lambda_R$ and $\lambda_L$ indicate a maximum in a specific frequency band for the power transfer function of the router in the first transmission direction and the power transfer function of the router in the second transmission direction.

* * * * *

UNITED STATES PATENT AND TRADEMARK OFFICE
CERTIFICATE OF CORRECTION

PATENT NO. : 6,724,995 B1
DATED : April 20, 2004
INVENTOR(S) : René E. Kristiansen It is certified that error appears in the above-identified patent and that said Letters Patent is hereby corrected as shown below:

Column 2,
Line 38, delete "optical,difference" and insert -- optical difference --.

Column 4,
Line 39, delete "$\lambda_R$ ." and insert -- $\lambda_R$ --.

Column 5,
Line 15, delete "$T_1$" and insert -- $T_2$ --.
Line 58, delete "($\lambda_2$" and insert -- ($\lambda_2$) --.

Column 6,
Line 5, delete "($\lambda_2$" and insert -- ($\lambda_2$) --.

Line 9, delete "$e^{j\pi/2}$" and insert -- $e^{j\frac{\pi}{2}}$ --.

Line 27, before "the port D" and insert -- on --.
Line 58, after "four channels" delete "$\lambda_{r2}$" and insert -- $\lambda_{r1}$ --.

Column 8,
Line 55, after "and" delete "$X_{12}$" and insert -- $\lambda_{12}$ --.

Signed and Sealed this

Second Day of May, 2006

JON W. DUDAS
*Director of the United States Patent and Trademark Office*